United States Patent [19]

Kadowaki

[11] Patent Number: 4,958,219
[45] Date of Patent: Sep. 18, 1990

[54] COLOR IMAGE FORMING APPARATUS

[75] Inventor: Toshihiro Kadowaki, Yokohama, Japan

[73] Assignee: Canon Kabushiki Kaisha, Tokyo, Japan

[21] Appl. No.: 298,352

[22] Filed: Jan. 18, 1989

[30] Foreign Application Priority Data

Jan. 19, 1988 [JP] Japan .................. 63-010137

[51] Int. Cl.⁵ .............................. H04N 1/46
[52] U.S. Cl. ........................ 358/75; 359/79; 359/80
[58] Field of Search ............ 358/75, 80, 280, 443, 358/444, 479, 79

[56] References Cited

U.S. PATENT DOCUMENTS

| | | | |
|---|---|---|---|
| 4,636,844 | 1/1987 | Sasaki | 358/80 |
| 4,656,505 | 4/1987 | Yamada et al. | 358/80 |
| 4,682,216 | 7/1987 | Sasaki et al. | 358/75 |
| 4,727,434 | 2/1988 | Kawamura | 358/75 |
| 4,731,662 | 3/1988 | Udagawa et al. | 358/75 |
| 4,745,467 | 5/1988 | Sekizawa et al. | 358/75 |
| 4,811,114 | 3/1989 | Yamamoto et al. | 358/280 |

Primary Examiner—James J. Groody
Assistant Examiner—Kim Yen Vu
Attorney, Agent, or Firm—Fitzpatrick Cella Harper & Scinto

[57] ABSTRACT

A color image forming apparatus provided with an input terminal for plural input color component signals, an independent input terminal for an output color component control signal, a processing circuit for processing the input color component signal to obtain plural output color component signals specific to the apparatus, and image forming means for forming each color component image according to the value of each output color component signal, in which the processing circuit is capable of controlling the calculation of output color component control signals according to the value of the output color component control signal. In one illustrated embodiment, the output color component signal is adapted to maintain a black output color component at a predetermined value.

50 Claims, 11 Drawing Sheets

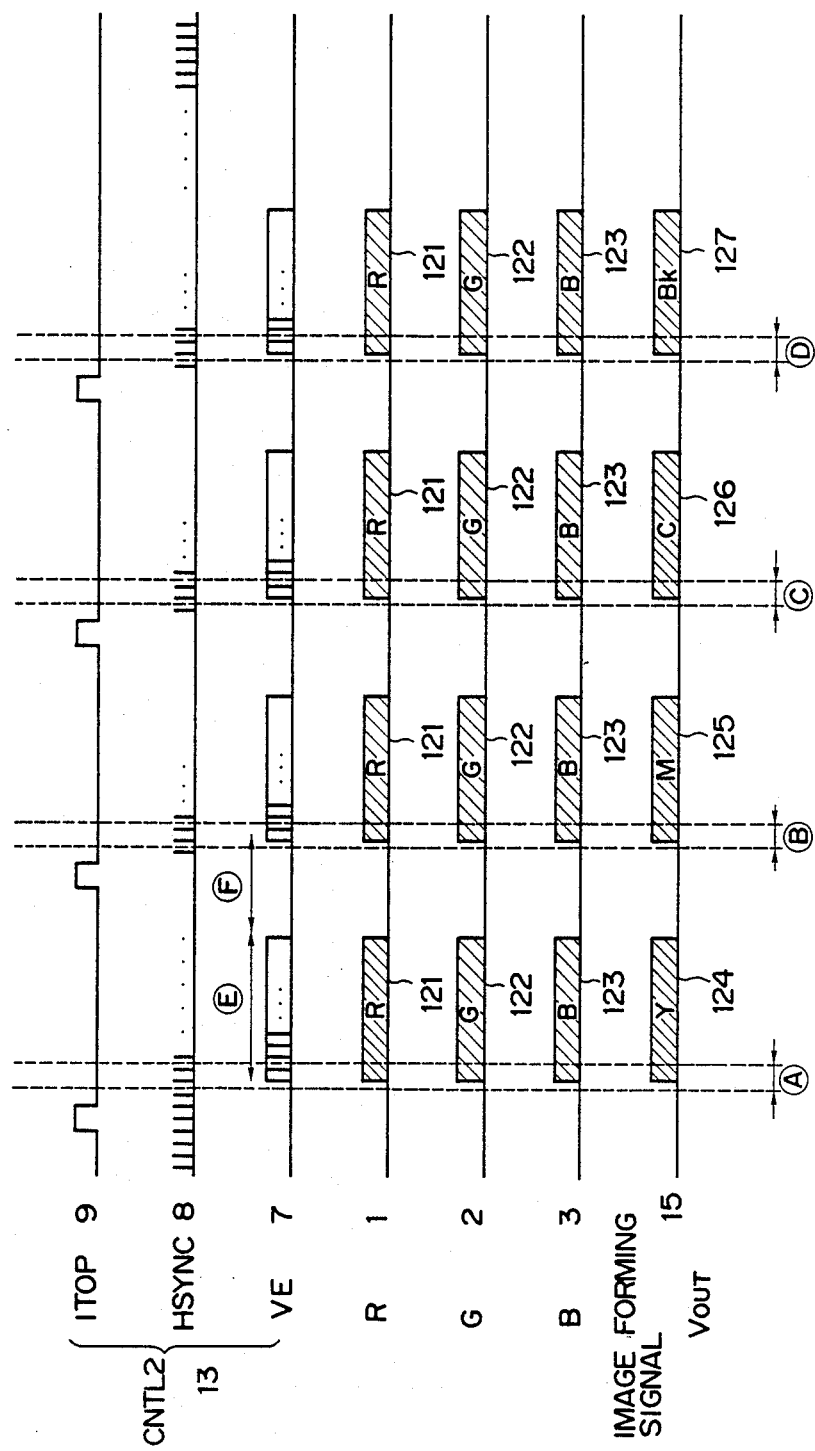

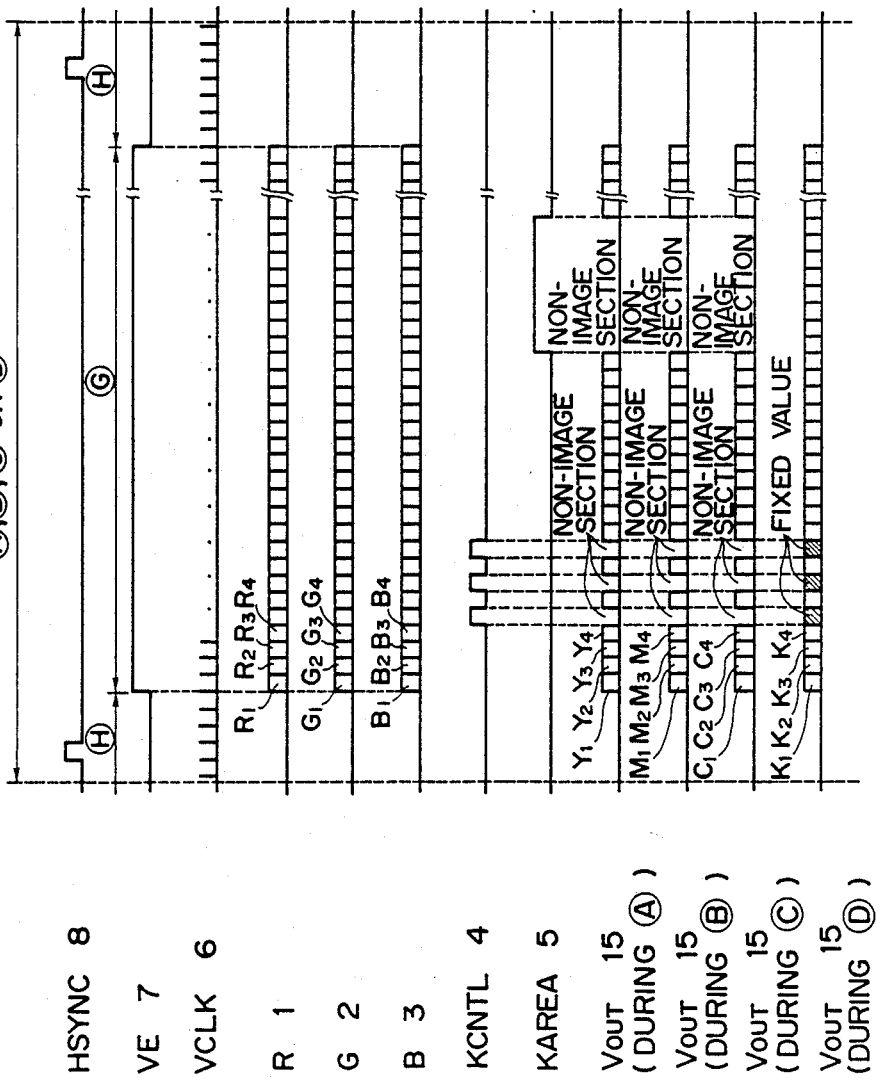

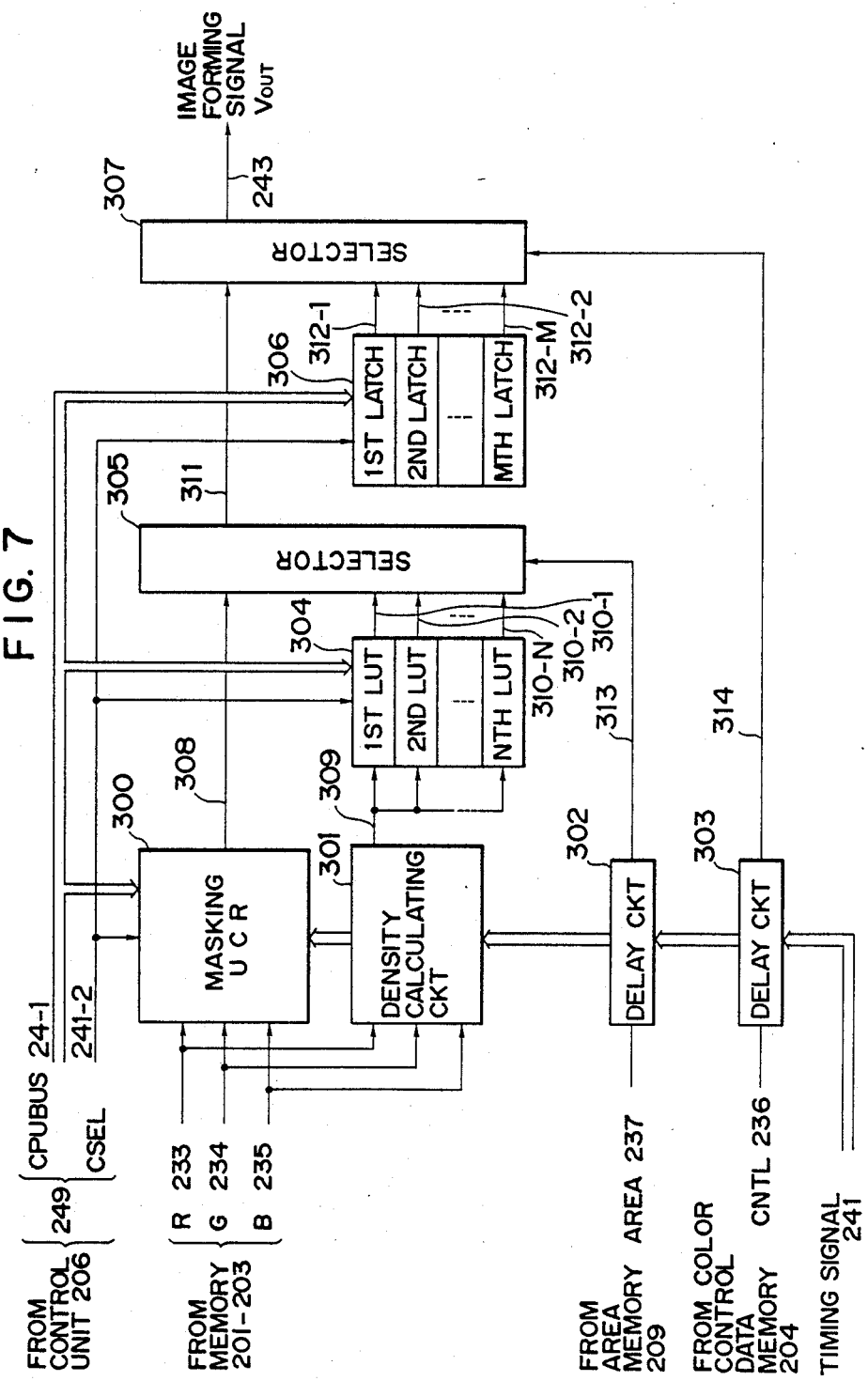

COLOR IMAGE FORMING APPARATUS

BACKGROUND OF THE INVENTION

1. Field of the Invention

The present invention relates to a color image forming apparatus.

2. Related Background Art

In conventional monochromatic image forming apparatuses, the input image signal received from a host apparatus is subjected for example to a tonal conversion to obtain an image signal specific to the apparatus, and the image formation is carried out, based on said signal. The input image signal is proportional, in general, to the luminocity or the density. On the other hand, color image forming apparatuses can be divided into two types. In the first type, plural color component signals received from the host apparatus are respectively subjected to tonal conversions to obtain color component image signals specific to the apparatus, and said signals are utilized in forming color component images. This type requires input color component signals corresponding to the color components specific to the apparatus. In the second type, plural color component input signals received from the host apparatus are subjected to masking, tonal conversion etc. to obtain plural color component signals specific to the apparatus, which are utilized in forming color component images. In this type, the input color components may be different from the color components utilized in image formation. For example R, G, B input components can be utilized to generate color component signals of C, M, Y and K (black) which are utilized for image formation.

In the above-mentioned monochromic image forming apparatus, the host apparatus can form an image according to its intention, since the input image signal and the signal used in image formation have almost one-to-one correspondence.

On the other hand, in the color image forming apparatus of the first type explained above, the host apparatus has to supply color component signals specific to the image forming apparatus, and is unable to form an image matching its intention, unless characteristics specific to the image forming apparatus, for example the positions of the color components in the color space, are made known to the host apparatus. Also said input color component signals have to be changed according to the type of the image forming apparatus, since they are specific to the image forming apparatus.

The color image forming apparatus of the second type is not associated with this drawback, as it can receive standard color component signals such as RGB luminance signals in the NTSC format, and convert said signal into color component signals specific to the apparatus, such as C, M, Y, Bk density signals. However, in the apparatus of this type, if given an ability of black image formation by extracting black component, the input image signals are subjected to masking so that other color components are inevitably mixed in, even when image formation with black color only is desired. Also if the input image contains a character area such as black characters, satisfactory character image cannot be obtained unless the input image signals corresponding to the characters are adjusted by the host apparatus to a value suitable for the characters. Therefore, in the apparatus of this type, an image intended by the host apparatus cannot be obtained only through the control of the input image signals to the image forming apparatus.

SUMMARY OF THE INVENTION

A first object of the present invention is to provide a color image forming apparatus not associated with the above-mentioned drawbacks and capable of forming an intended image.

Another object of the present invention is to provide a color image forming apparatus capable of reproducing a desired portion of a given color image satisfactorily with a particular color.

Still another object of the present invention is to provide a color image forming apparatus capable of satisfactorily reproducing, in a color image, an area which is to be reproduced with black color only.

The foregoing objects can be achieved, according to a preferred embodiment of the present invention, by a color image forming apparatus comprising:

input means for plural input color component signals and an output color component control signals;

process means for processing the input color component signals to obtain plural output color component signals specific to the apparatus; and image forming means for forming color component images according to the values of the output color component signals;

wherein said process means is adapted to control the calculation of the output color component signals according to the value of the output color component control signal.

Still another object of the present invention is to provide a novel interface for the color image forming apparatus.

Still another object of the present invention is to provide a color image forming apparatus matching said novel interface.

Still other objects of the present invention, and the advantages thereof, will become fully apparent from the following description of embodiments thereof, to be taken in conjunction with the attached drawings.

BRIEF DESCRIPTION OF THE DRAWINGS

FIGS. 4A and 4B are timing charts of image signals and other signals in the first embodiment;

FIG. 7 is a block diagram of an image process unit in said second embodiment;

DETAILED DESCRIPTION OF THE PREFERRED EMBODIMENTS

Now the present invention will be clarified in detail by embodiments thereof shown in the attached drawings.

Figure 1:
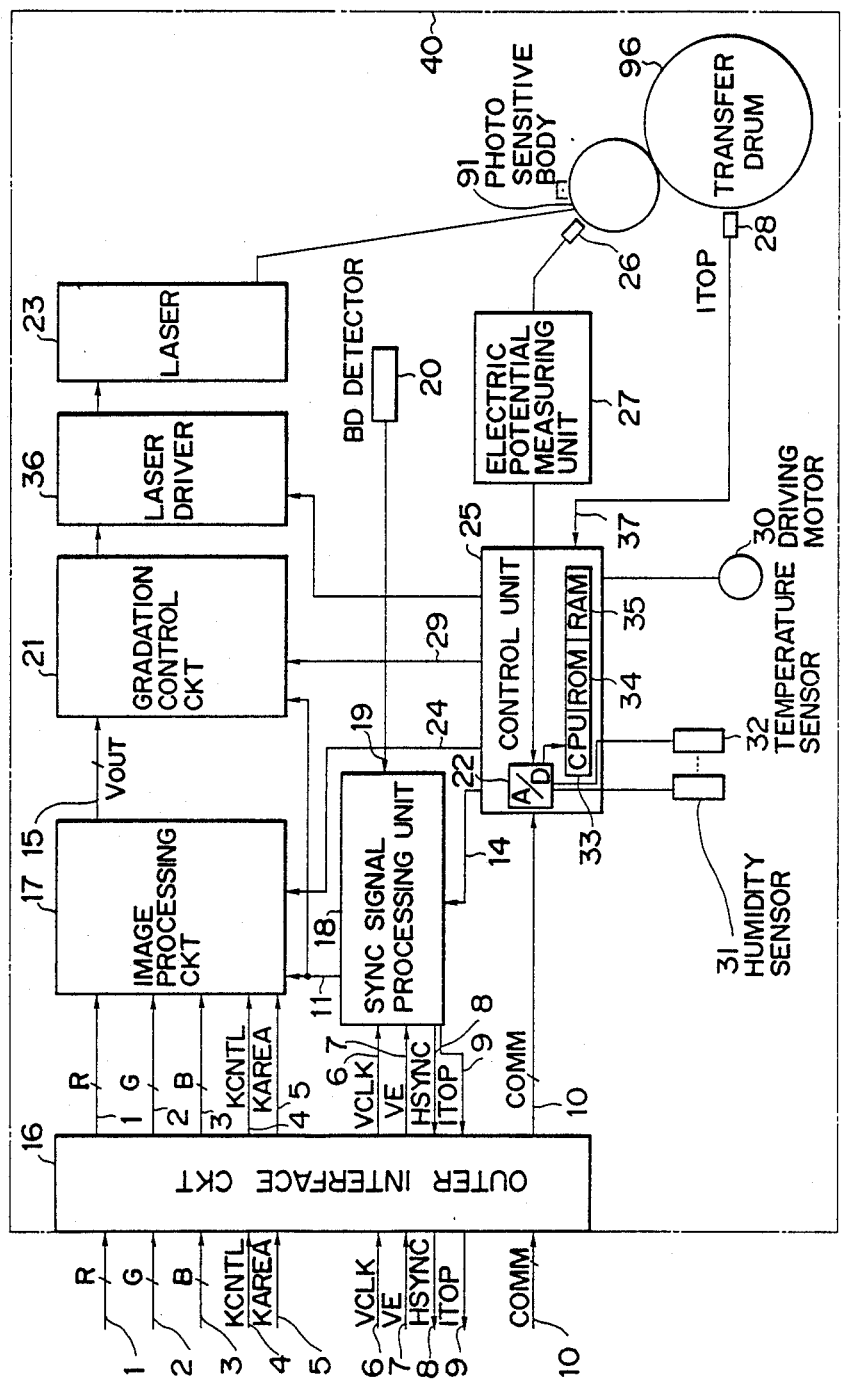
FIG. 1 is a block diagram of a color printer constituting a first embodiment of the present invention.

FIG. 1 is a block diagram of a color printer embodying the present invention. An external interface circuit 16 sends a vertical synchronization signal (ITOP) 8 and a horizontal synchronization signal (HSYNC) 8 generated in a synchronization signal processing unit 18 to external host equipment, and also receives an image section signal (VE) 7 and an image carrier signal (VCLK) 6 sent from the host equipment, and a red component signal (R) 1, a green component signal (G) 2, a blue component signal (B) 3, a black control signal (KCNTL) 4 and a black area signal (KAREA) 5 sent in synchronization with said carrier signal. In the present embodiment these image signals are transferred four times corresponding to four image formations to be explained later.

An image control signal (COMM) 10 is used for exchanging various commands and status between the host equipment and a control unit 15 in the color printer, is composed for example of a format RS232C, and is utilized for example for setting the print mode. The image signals 1–5 synchronized with the timing signals 6–9 are sent from the external interface circuit 16 to an image processing circuit 17.

Based on the red component signal 1, green component signals 2, blue component signal 3, black control signal 4 and black area signal 5, the image processing circuit 17 generates a yellow (Y) component signal, a magenta (M) component signal, a cyan (C) component signal and a black (Bk) component signal in frame sequential form corresponding to four image formations to be explained later, and sends said signal as an image forming signal (VOUT) 15 to a gradation control circuit 21.

The data adjusted in the gradation control circuit 21 to the color reproduction densities of the printer and subjected to correction of gradation with a look-up table (LUT) are supplied to a laser driver 36 to effect image formation with a laser 23.

The control unit 25 is provided with a CPU 33, a ROM 34 and a RAM 35, and performs not only the communication with the external host equipment but also the control of various units of the color printer 40. There are provided a potential sensor 26 for detecting the charge on a photosensitive member 29, and a potential. measuring unit 27 for converting the output of the potential sensor 26 into a digital signal for supply to the control unit 25. The potential data entered into the control unit 25 are read by the CPU 33 for use in the control. A driving motor 30 is used for driving a transfer drum 96 and other driven elements in the color printer.

A signal 37 from an image top sensor 28 is supplied to the control unit 25, and is utilized, in the synchronization signal processing unit 18, for generating the vertical synchronization signal (ITOP) 9.

A signal 19 from a beam detector (BD) 20 is supplied to said synchronization signal processing unit 18 and utilized for generating the horizontal synchronization signal (HSYNC) 8.

Also signals from a humidity sensor 31 and a temperature sensor for correcting the developing characteristics are supplied to the control unit 25 through an A/D converter 22.

Figure 2:
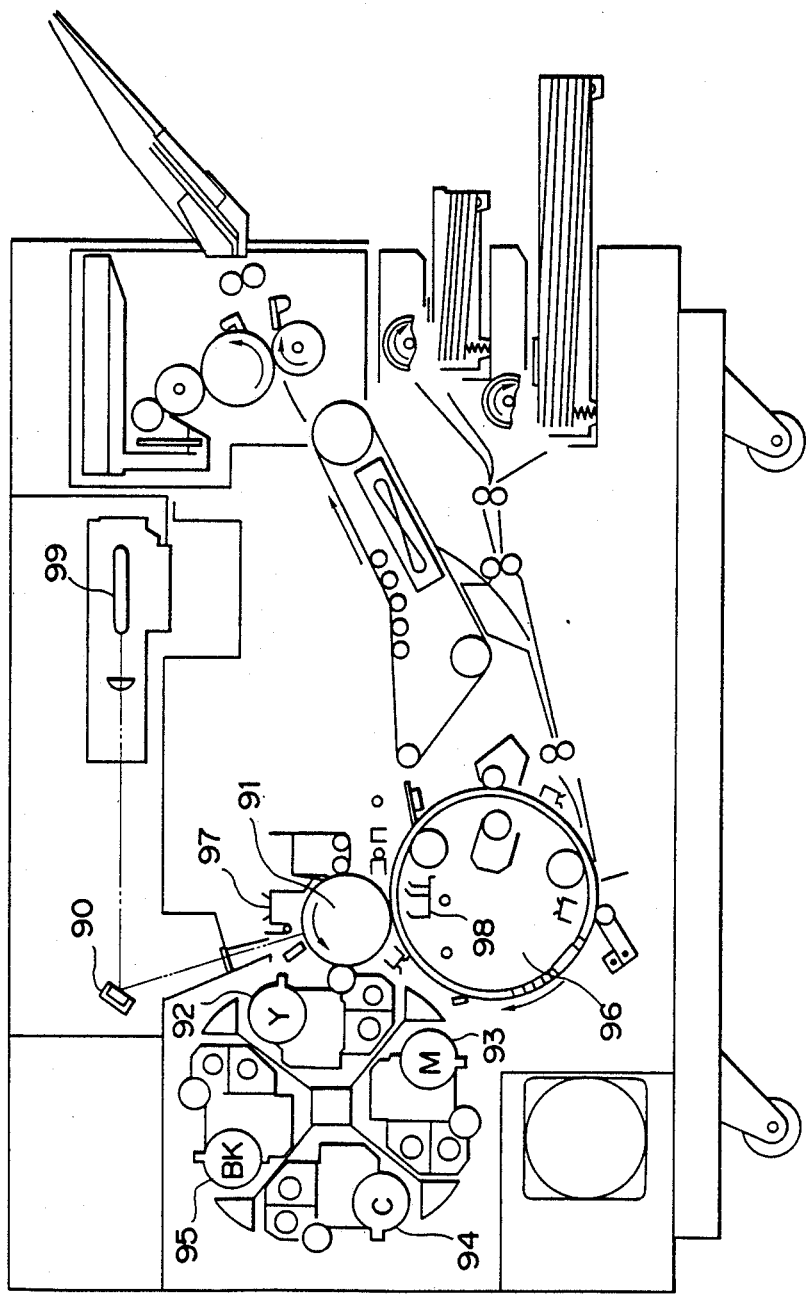
FIG. 2 is a cross-sectional view of said color printer.

FIG. 2 is a cross-sectional view of the color printer of the present embodiment.

The input color component signals (R, G, B) 1–3, black control signal(KCNTL) 4 and black area signal (KAREA) 5 supplied from the outside in parallel manner are converted by the image processing circuit 17 and the gradation control circuit 21 into frame sequential output color component signals VOUT 15 specific to the apparatus (1st frame Y, 2nd frame M, 3rd frame C, and 4th frame K), then subjected for example to pulse width modulation, and finally used for driving the laser.

The laser beam modulated according to the image data is put into a scanning motion by a polygon mirror 99 rotating at a high speed, and is then reflected by a mirror 90 to provide dot exposures corresponding to the image on the surface of a photosensitive drum 91. A horizontal scanning of the laser beam corresponds to a horizontal scanning line of the image, having a width of 1/16 mm in the present embodiment. The photosensitive drum 91, being rotated at a constant speed in the direction indicated by an arrow, is exposed to the image, by main scanning achieved by the motion of said laser beam and sub scanning achieved by the rotation of the drum 91. Prior to exposure, the photosensitive drum 91 is given uniform change by a charger 97, and such charged photosensitive member generates a latent image when subjected to exposure. A latent image corresponding to a particular color signal is rendered visible by one of developing units 92–95 corresponding to said color.

For example, in the first image formation in which the yellow component signal is given from the image processing circuit 17, the photosensitive drum 91 receives exposure of dot image of the yellow component of the original, and development is conducted with the yellow developing unit 92.

Then the yellow image is transferred onto a sheet wound on a transfer drum 96, at the contact point thereof with the photosensitive drum 91, by means of a transfer charger 98. In the 2nd, 3rd and 4th image formations, magenta, cyan and black tonet images are formed according to the magenta component signal, cyan component signal and black component signal released from the image processing circuit 17, and said images are superposed on said sheet to obtain a color image consisting of four color toners.

Figure 3:
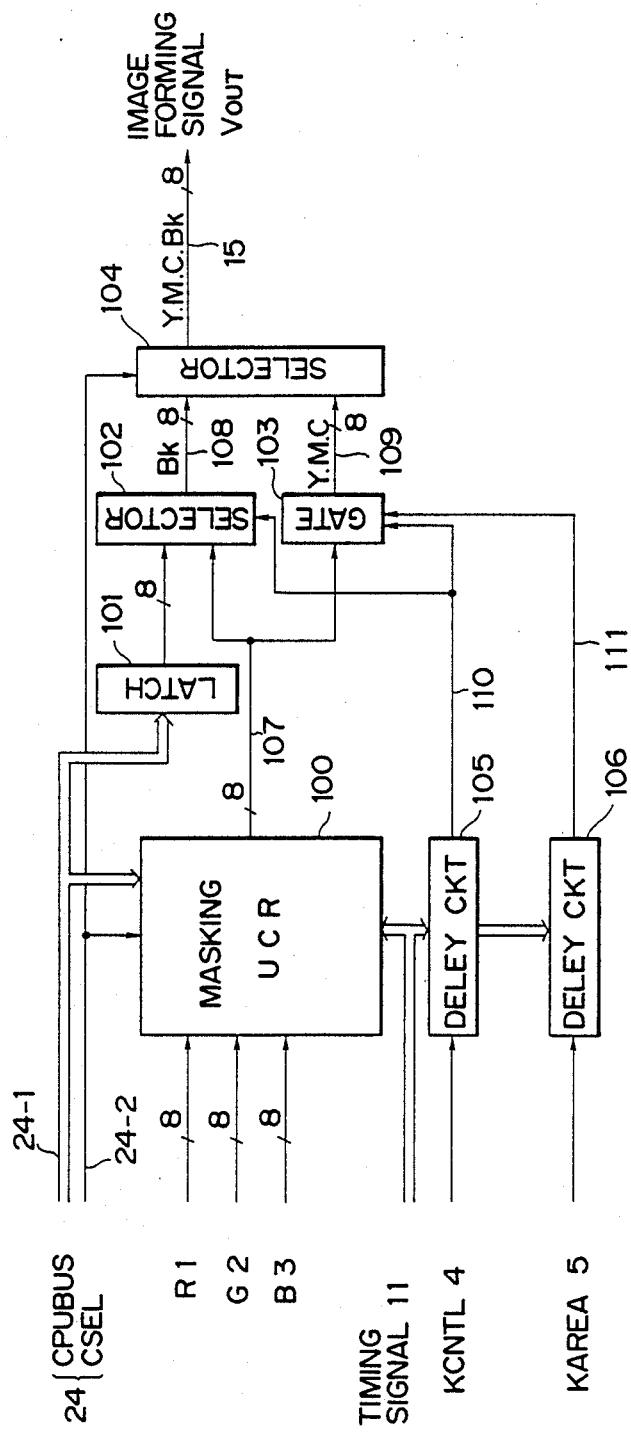
FIG. 3 is a block diagram of an image process unit 17 shown in FIG. 1.

FIG. 3 is a block diagram of the image processing circuit 17 shown in FIG. 1. The image data (red component signal 8, green component signal 9, blue component signal 10) supplied from the external interface circuit 16 four times in parallel manner corresponding to four image formation are converted each time into yellow component data, magenta component data, cyan component data and black component data by a masking/UCR circuit 100, and are supplied to a selector 102 and a gate 103. The masking/UCR circuit 100 is utilized for converting plural input color component data into color component data corresponding to image forming materials specific to the printer, including black, and is detailed described in the Japanese Patent Application 61-271448. The output color component data from the masking/UCR circuit 100 is selected from yellow, magenta, cyan and black according to the value of a selection signal (CSEL) 24-2 given by the control unit 25. In the present embodiment, yellow, magenta, cyan or black color component data are calculated and released respectively according to CSEL=0, 1, 2 or 3. Said selection signal (CSEL) 24-2 is also supplied to a selector 104 to select either the output of the gate 103 when yellow, magenta or cyan color component data are released from the masking/UCR circuit 100, or the output of a selector 102 when black color component data are released. The black area signal 5 is delayed in a delay circuit 106 by an amount same as the delay of the image data 6-10 in the masking/UCR circuit 100, and is supplied to the gate circuit 103. Similarly the black control signal 5 is delayed by a delay circuit 105 and supplied to the gate circuit 103 and selector 102.

The gate circuit 103 releases an output of a value for not effecting the image formation, when at least either of the black control signal 110 and black area signal 111 is "1". (In the present embodiment, the image forming signal indicates the toner density. and image formation is not conducted if said signal is zero). The output 109 of the gate circuit 103 is selected by the selector 104 in case of yellow, magenta or cyan component image formation, and, such color component image is not formed if the black control signal 4 or the black area signal 5 is at the level "1" during such color component image formation.

The selector 102, receiving the black control signal 4 as the select signal, selects either the output of a latch 101 or the output of the masking/UCR circuit 100 respectively when said select signal is "1" or "0". An arbitrary value can be set in the latch 101 by means of a CPU-bus 24-1. Since the output of the selector 102 is selected by the selector 104 during the black component image formation, an image of a density corresponding to the value set in latch 101 by the CPU 33 is formed in a section in which the black control signal 4 is "1" during the formation of black component image.

FIG. 4A is a timing chart indicating the vertical synchronization signal (ITOP) 9 and horizontal synchronization signal (HSYNC) 8 generated by the synchronization signal processing unit 18; the image section signal (VE) 7, red component signal 1, green component signal 2, and blue component signal 3 supplied from the host equipment; and the image forming signal (VOUT) 15 supplied from the image processing circuit 17, and illustrating how four image formations are conducted. Each image formation is conducted in synchronization with the vertical synchronization signal (ITOP) 9, and, there is formed each time, from the red component data 121, green component data 122 and blue component data 123, the yellow image data 124, magenta component data 125, cyan component data 126 or black component data 127 as the image forming signal (VOUT) 15. In combination with the horizontal synchronization signal (HSYNC) 8, the image section signal (VE) 7 indicates the effective section of the image in the horizontal and vertical directions ((E) indicating the image effective section in the vertical direction, while (F) indicating the image ineffective section in the vertical direction).

FIG. 4B is a timing chart of various signals in the periods (A), (B), (C) and (D) in FIG. 4A. These signals remain same in the periods (A), (B), (C) and (D) except for the image forming signal (VOUT) 15. This timing chart indicates a period from a horizontal sync. signal (HSYNC) 8 to a next horizontal sync. signal, and indicates the timing of various signals in a horizontal scanning period. In correspondence with the horizontal sync. signal 8, the image section signal(VE) 7 indicates the effective image section in a horizontal scanning line ((G) being effective image section, and (H) being ineffective image section in the horizontal direction). The image data 1-5, and the output (VOUT) 15 of the image processing circuit are all synchronized with the image carrying clock signal (VCLK) 6. In fact the output (VOUT) 15 is delayed by several clocks from the image data 1 - 5 due to the delay in the masking/UCR circuit 100, but this delay is considered as zero for the purpose of simplicity in FIG. 4B. As already explained in relation to FIG. 3, during a period in which the black control signal (CNTL) 4 is "1", the image forming signal for yellow, magenta or cyan component becomes "0", so that the image formation is not conducted. On the other hand, in a section (D), the image forming signal for the black component assumes a fixed value set by the CPU in the latch 101. In this manner, in a period in which the black control signal (KCNTL) is "1", the image formation is conducted with black component of fixed value only.

Also as explained in relation to FIG. 3, during a period in which the black area signal (KAREA) is "1", the image forming signal for yellow, magenta or cyan component becomes "0", so that the image formation is not conducted. On the other hand, in a section (D), the image forming signal for the black component is the black component calculated from the input image signals 1-3. In this manner, in a period in which the black area signal (KAREA) is "1", the image formation is conducted with the black component of the input image only.

Figure 5:
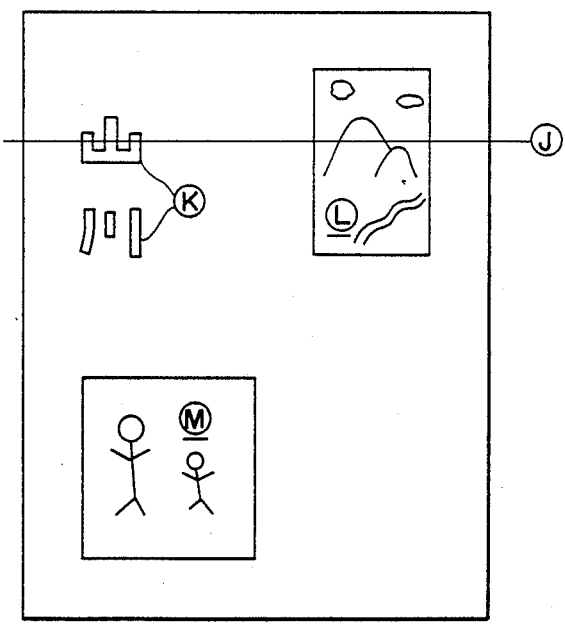
FIG. 5 is a schematic showing the mode of use of an output color component control signal in the first embodiment.

FIG. 5 is a view showing an example of use of the black control signal and the black area signal at the host equipment, wherein (K) is a black character area; (L) is a natural image read with a monochromic scanner; and (M) is a natural image read with a color scanner. (L) can also be a black-and-white graph, chart or pattern, while (M) can also be a color graph, chart or pattern. FIG. 5 can be considered as a representative example of layout in desktop publishing or the like. In case of reproducing this image with the image forming apparatus, it is desirable to form the image (K) with a uniform black density, and the image (L) in black and white tone.

On the other hand, in the average host equipment, the image is generally maintained in an additive color system consisting of red, green and blue, while the image formation is conducted in a subtractive color system consisting of yellow, magenta, cyan and black. For this reason there is required a conversion from the RGB system to the CMYBk system in the image processing circuit as explained in FIG. 1. Consequently, even if R, G, B are made as same levels, the image does not necessarily appear in black and white, due to the masking or undercolor removal treatment.

On the other hand, a desirable image formation is made possible by sending, from the host equipment to the image forming apparatus of the present embodiment, a black control signal (KCNTL) which becomes "1" in the area (K) and a black area signal (KAREA) which becomes "1" in the area (L).

In the present embodiment, as explained in the foregoing, the calculation of the black component signal and other color component signals is so controlled that the image is formed only with black of fixed value in an area designated by the value of the black control signal (KCNTL), and that the image is formed only with the black component in the input image signals in an area designated by the value of the black area signal (KAREA).

In the present embodiment the black component is treated separately, but it is possible to treat any other color component in a similar manner. Also in the area in which the black control signal is "1", the image is formed only with black of fixed value, but it is also possible to form the image with an arbitrary combination of color components of a fixed value.

2nd embodiment

Figure 6:
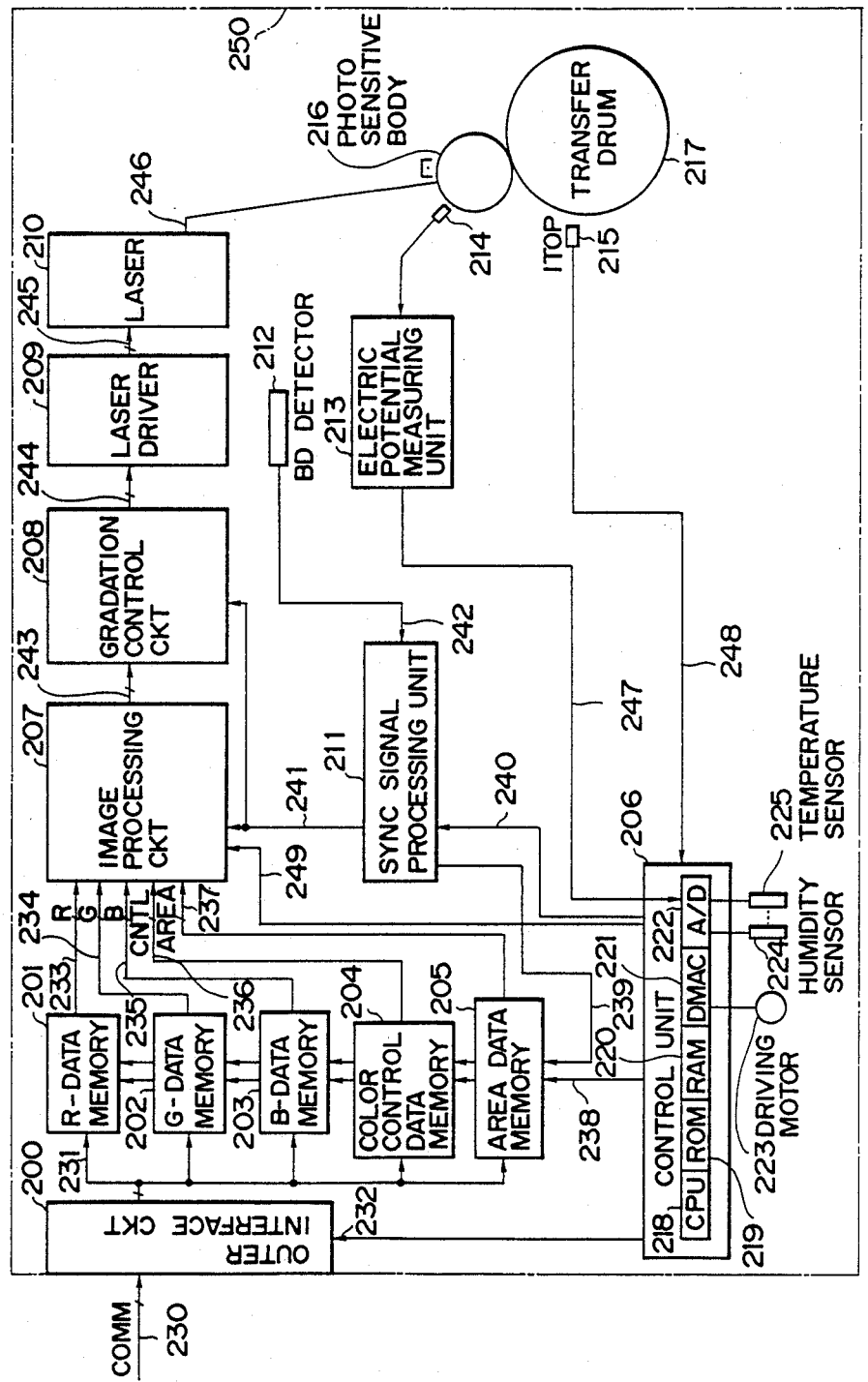
FIG. 6 is a block diagram of a color printer constituting a second embodiment of the present invention.

FIG. 6 is a block diagram of a color printer of this embodiment, wherein 230 is a pan-purpose digital interface such as GPIB interface or centronics interface, and 200 is an interface circuit therefor. A control unit 206 communicates with an external host equipment through the external interface circuit 200, thus exchanging various commands, status signals and image data. Upon receiving an image transfer the control unit 206 transfers the image data thereafter transferred through the external interface circuit 200 to one of image data memories 201-205, according to the kind of said command. The actual data transfer is conducted by DMA transfer, by means of a direct memory access controller (DMAC) 221 in the control unit 206. The DMA transfer is commonly employed in usual microcomputer systems.

The R-data memory 201, G-data memory 202, B-data memory 203, color control data memory 204 and area data memory 205 are respectively provided for storing read component image data, green component image data, blue component image data, color control data and area data, in the form transmitted from the host equipment. The image data stored in said memories 201-205 are read, at the printing operation, under the control by the synchronization signal processing unit, and are sent to the image processing circuit 207. Based on the red component signal 233, green component signal 234, blue component signal 235, color control signal 236 and area signal 237, the image processing circuit 207 generates the yellow (Y) component signal, magenta (M) component signal, cyan (C) component signal and black (Bk) component signal in frame sequential manner, respectively corresponding to four image formations as in the first embodiment, and sends thus generated signal as the image forming signal (VOUT) 243 to a gradation control circuit 208.

The data corrected in gradation in the gradation control circuit 208 so as to match the color reproduction density of the printer, for example with a look-up table, are supplied to a laser driver 209 for driving a laser 210, thereby forming an image.

The control unit 206 is provided with a CPU 218, a ROM 219 and RAM 220, and performs not only the communication with the external host equipment but also the control of various units of the color printer 250. There are provided a potential sensor 214 for detecting the charge on a photosensitive member 216, and a potential measuring unit 213 for converting the output of the potential sensor 214 into a digital signal for supply to the control unit 206. The potential data entered into the control unit 206 are read by the CPU 218 for use in the control. A driving motor 223 is used for driving a transfer drum 217 and other driven elements in the color printer.

A signal 248 from an image top sensor 215 is supplied to the control unit 206, and is utilized, in the synchronization signal processing unit 211, for generating the vertical synchronization signal (ITOP).

A signal 242 from a beam detector (BD) 212 is supplied to said synchronization signal processing unit 211 and utilized for generating the horizontal synchronization signal (HSYNC).

Also signals from a humidity sensor 31 and a temperature sensor 32 for correcting the developing characteristics are supplied to the control unit 25 through an A/D converter 22.

In the present embodiment, the image forming means starting from the gradation control circuit 208 is same as that in the first embodiment, particularly as explained in relation to FIG. 2.

FIG. 7 is a block diagram of the image processing circuit of the present embodiment. The input color component data (red component signal 233, green component signal 234, blue component signal 235) sent from the image memories 201 - 205 four times in parallel manner corresponding to four image formations are converted, in a masking/UCR circuit 300 each time into yellow component data, magenta component data, cyan component data and black component data for supply to a selector 305. Separately, said input color component data are converted into density by a density calculation circuit 301 Thus same density data are supplied each time to a LUT (look-up table) circuit 304. Said density can be a signal indicating the density of the color to be constructed from the input color components, for example a value:

$$D_i = \alpha_1 R_i + \alpha_2 G_i + \alpha_3 B_i$$

wherein Ri, Gi and Bi are respectively red component, green component and blue component, and $\alpha_1, \alpha_2, \alpha_3$ are coefficients.

The output color component data from the masking-/UCR circuit 300 is selected from yellow, magenta, cyan and black according to the value of a selection signal (CSEL) 241-2 given by the control unit 206. In the present embodiment, yellow, magenta, cyan or black color component data are calculated and released respectively according to CSEL=0, 1, 2 or 3. The LUT circuit 304 consists of N look-up tables. Each look-up table has a sub table for each output color component, and one of said sub stables is selected by the value of the selection (CSEL) 241-2. The selected sub table, in response to a density 309 entered from the density calculating circuit 301, releases corresponding image data to a selector 305. Each LUT is composed of a ROM or a RAM. In the latter the data can be rewritten by the CPU, through a CPU bus 241-1.

The area signal 237, sent simultaneously with the image data 233-235 is delayed in a delay circuit 302 by an amount same as that of delay caused on the image data 233-235 in the masking/UCR circuit and in the density calculating circuit, and is supplied as a select signal to the selector 305.

Said area signal 237 has a number of bits enough for selecting N+1 signals, and is used for selecting one of the output signal (VOUT) of the masking/UCR circuit and the output signals 310-1-310-N of the 1st to Nth LUT in the LUT circuit 304. In the present embodiment, the output of the masking/UCR circuit is selected when said signal is "0", and the outputs of the LUT's are selected otherwise, by means of the selector 305.

The output of the selector 305 is supplied to a selector 307.

A latch circuit 306 consists of M latches, each in turn consisting of sublatches corresponding to output color components, one of which is selected according to the value of the selection signal (CSEL) 241-2. The output of thus selected sublatch in each latch is supplied to the selector 307. Each latch is used for holding the fixed value of each output component, set by the CPU through the CPU bus 241-1.

The color control signal 236 sent simultaneously with the image data 233-235 is delayed in the delay circuit as in the case of area signal 237, and supplied as a select signal to the selector 307.

Said signal has a number of bits enough for selecting M.1 signals, and is used for selecting, as the image forming signal (VOUT) 243, one of the output signal 311 of the selector 305 and the output signals 312-1-312-M of the 1st to Mth latches in the latch circuit 306. In the present embodiment, the output of the selector 305 is selected when said signal is "0", and the outputs of the latch circuit 306 are selected otherwise.

As explained above, if the color control signal (CNTL) 236 is not "0", one of fixed color component data set in the 1st-Nth latches in the latch circuit 306 is selected according to the value of said signal, and the image formation is conducted with said value. For example, if combinations of color components providing red, blue and green close to the ideal primary colors are stored in the 1st, 2nd and 3rd latches, the image formation is conducted unconditionally with red, blue and green whenever the color control signal (CNTL) 236 is "1", "2" and "3".

Figure 8A:
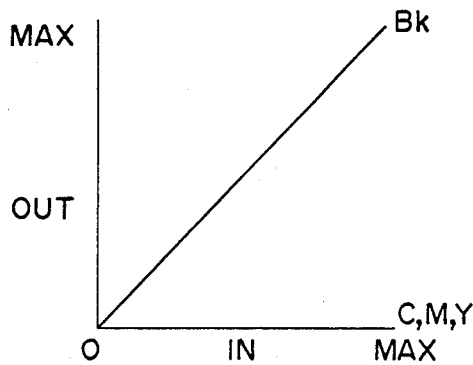
FIGS. 8A to 8E are charts showing examples of a look-up table in the image process unit of the second embodiment.
Figure 8B:
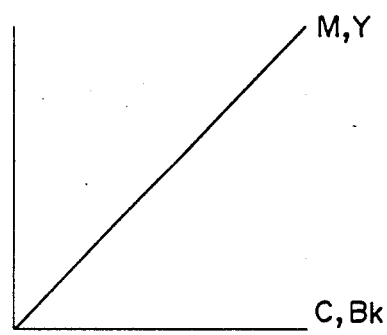
Figure 8C:
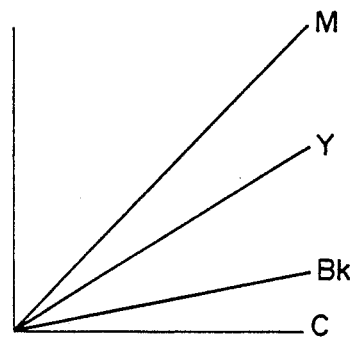
Figure 8D:
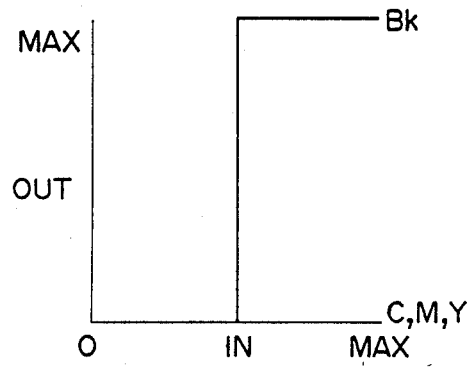
Figure 8E:
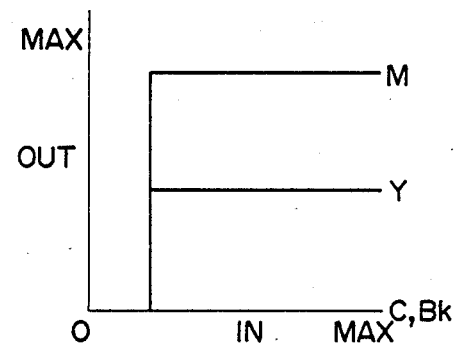

Then, if the color control signal (CNTL) 236 is "0" and the area signal (AREA) 237 is other than "0", one of the 1st - Nth LUT of the LUT circuit 304 is selected according to the value of said signal, and the image formation is conducted with the output value of selected LUT corresponding to the density data of the input image. As an example, it is assumed that five LUT's shown in FIGS. 8A to 8E constitute 1st to 5th LUT's in the LUT CIRCUIT, which are respectively selected by the values "1" to "5" of the area signal (AREA) 237. Thus, in response to the area signal (AREA) 237 "1", a LUT shown in FIG. 8A is selected, in which output is zero for any yellow, magenta or cyan input component. On the other hand, for black component, there is provided output data proportional to the input density. Thus the density information of the input image is formed with black. When said area signal is "2", there is selected a table with the characteristics shown in FIG. 8B, whereby the density information of the image is reproduced with magenta and yellow components, or, with red color. When said area signal is "3", the selected table has the characteristics shown in FIG. 8C, whereby the density information of the image is reproduced with color components of a ratio: yellow: magenta, cyan, black=3:5:0:1. When the area signal is "4", there is selected a table with the characteristics shown in FIG. 8D, in which the image formation is not conducted for yellow, magenta or cyan component, and the image formation is conducted with the highest level of black only when the black density exceeds a certain value. When the area signal is "5", there is selected a table of the characteristics shown in FIG. 8E, in which the image formation is conducted with a fixed value of yellow and magenta components with a ratio 1:2 only for the density value exceeding a certain level, but is not conducted otherwise.

Finally, if the color control signal (CNTL) 236 and the area signal (AREA) 237 are both "0", the image formation is conducted with the output color component signals calculated from the input color component signals by the masking/UCR circuit.

Timing

The timing of image signals or other signals is substantially same as that in the first embodiment, as already explained in relation to FIG. 4. The signal KCNTL is expanded to correspond to several bits of the signal CNTL, and the signal KAREA is expanded to correspond to several bits of the signal AREA, but the relation of these signals with the signal VOUT 243 is as already explained before The signals ITOP, HSYNC, VE and VCLK are all generated in the synchronization signal processing unit 211, in contrast to the first embodiment, but the timing of these signals is same as that in the first embodiment.

Control

Figure 9:
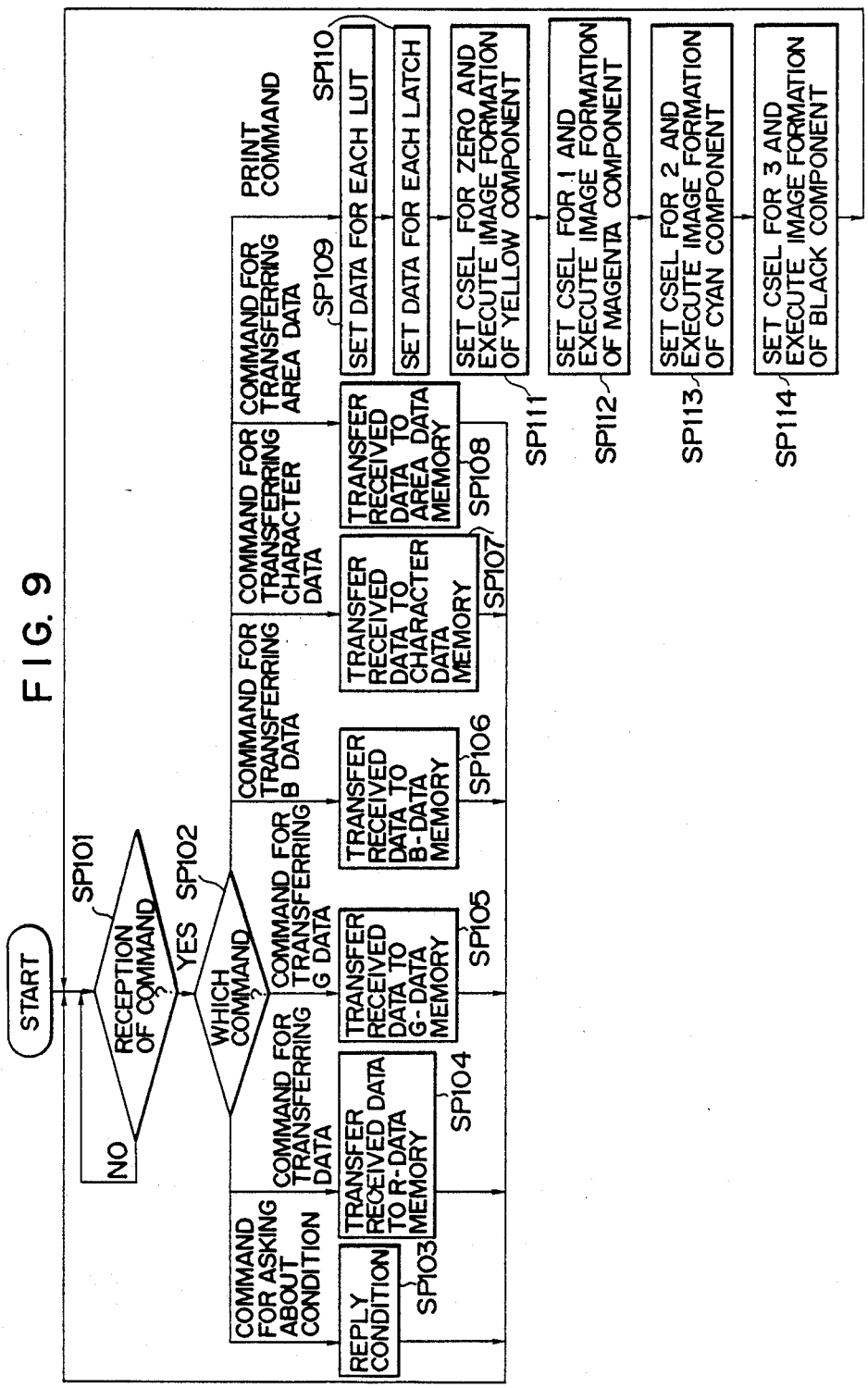
FIG. 9 is a flow chart showing the control sequence in the second embodiment.

FIG. 9 is a flow chart outlining the control sequence by the CPU 218 in the control unit 206. At first a step SP101 checks whether a command has been received from the external host equipment, and if received, a step SP102 discriminates said command, and the sequence branches to SP103-SP109 according to the result of discrimination. If it is a command asking the status, the status of the apparatus is sent to the host equipment, and the sequence returns to the step SP101. If it is a red data transfer command, a step SP104 transfers the transferred image data to the R-data memory 201, and the sequence returns to the step SP101. In case of other image data transfer commands, steps SP105-SP108 transfer the image data to the corresponding image data memories 202-205, and then the sequence returns to the steps SP101 If it is a print command, a step SP109 sets data in the look-up tables of the LUT circuit 304, for example as already shown in FIGS. 8A-8E. Then a step SP110 sets data in the latches of the latch circuit 306. As an example fixed values are set, respectively in the 1st to 3rd latches, for generating red, green and blue colors closest to the ideal primary colors. A step SP111 then sets the select signal (CSEL) 241-2 at "0", thereby conducting image formation with the yellow component Then steps SP112-SP114 similarly conduct formation of magenta image, cyan image and black image, and a color image is thus completed

Other embodiment

In the foregoing embodiments, the image development is conducted solely with softwares, but a part, for example font development, may be conducted by hardware.

Also in the foregoing embodiments, the image formation is achieved by an electrophotographic color printer, but there may be employed other processes, such as thermal transfer, silver halide-based photographic process or electrostatic process Also there may be employed so-colled 4D electrophotographic process, utilizing photosensitive drums for respective color components.

Furthermore, in the foregoing embodiments, an external interface circuit 16 such as GRIB (general purpose interface bus) is employed as the input means, and the signals R, G, B, KCNTL and KAREA are entered as the input and control signals. This may be replaced by a CPU bus such as VME bus, an off-line media such as magnetic tape or disk, or a local area network such as Ethernet. Also for entering an image there may be employed a video camera or a color scanner.

Also in the foregoing embodiments, an image processing circuit 17 detailedly shown in FIG. 7 is employed as the processing means for obtaining plural output color components specific to the apparatus from the input color component signals, but such structure is not limitative.

Furthermore, the foregoing embodiments employ a bit map memory of a resolving power same as that of the image forming apparatus, but it is also possible to use a smaller frame memory and to conduct an enlarging process at the image formation.

As detailedly explained in the foregoing, it is rendered possible to obtain an image matching the intention of the host equipment, by directly controlling the image signals for image formation through the output color component control signal.

Also the use of the black control signal (CNTL) and the black area signal (KAREA) as the interface, in addition to the R, G, B input signals, enables image formation with the black component only, in a color image.

In the foregoing embodiments, said control signal and area signal are utilized for the black component, but such signals may also be utilized for other colors.

What is claimed is:

1. A color image forming apparatus comprising:
   (a) input means for entering plural input color component signals and an output color component control signal, wherein said output color component control signal is input independently of said input color component signals;
   (b) process means for processing said plural input color component signals for obtaining plural output color component signals for obtaining plural output color component signals specific to the apparatus; and
   (c) control means for controlling the output color component signals from said process means, according to said output color component control signal.

2. An apparatus according to claim 1, further comprising:
   (a) image forming means for forming color component images respectively according to said output color component signals.

3. An apparatus according to claim 1, wherein said input means enters said plural input color component signals and said output color component control signal in parallel manner.

4. An apparatus according to claim 1, wherein said input color components are three primary color components.

5. An apparatus according to claim 1, wherein said output color component signals are complementary color components.

6. An apparatus according to claim 4, wherein said three primary color components are red, green and blue components.

7. An apparatus according to claim 5, wherein said complementary color components are yellow, magenta and cyan components.

8. An apparatus according to claim 1, wherein said output color component control signal is adapted to prohibit the output of predetermined components in the output color components.

9. An apparatus according to claim 8, wherein said output color component control signal is adapted to prohibit the output of predetermined components in the output color components and to maintain other output components at a predetermined value.

10. An apparatus according to claim 1, wherein said output color component control signal is adapted to maintain predetermined output color components at a predetermined value.

11. An apparatus according to claim 2, wherein said image forming means is adapted to effect image formation by an electrophotographic process.

12. An apparatus according to claim 8, wherein said predetermined components are those other than black.

13. An apparatus according to claim 10, wherein said predetermined component is black component.

14. An apparatus according to claim 1, wherein said process means comprises a masking circuit.

15. An interface adapted for use in a color image forming apparatus provided with process means for processing plural input color component signals to obtain output color component signals, comprising:
    (a) first input means for entering said plural input color component signals; and
    (b) second input means for entering an output color control signal for controlling the output of said output color component signals;
    wherein said first input means is independent of said second input means.

16. An interface according to claim 15, wherein said first and second input means enter said signals in parallel manner.

17. An interface according to claim 15, wherein said input color components are three primary color components.

18. An interface according to claim 15, wherein said output color component signals are complementary color components.

19. An interface according to claim 17, wherein said three primary color components are red, green and blue components.

20. An interface according to claim 18, wherein said complementary color components are yellow, magenta and cyan components.

21. An interface according to claim 15, wherein said output color component control signal is adapted to prohibit the output of predetermined components in the output color components.

22. An interface according to claim 21, wherein said output color component control signal is adapted to prohibit the output of predetermined components in the output color components and to maintain other output components at a predetermined value.

23. An interface according to claim 15, wherein said output color component control signal is adapted to maintain predetermined output color components at a predetermined value.

24. An interface according to claim 21, wherein said predetermined components are those other than black.

25. An interface according to claim 23, wherein said predetermined component is black component.

26. A color image forming apparatus comprising:
    (a) input means for entering plural input color component signals and an output color component control signal;
    (b) process means for processing said plural input color component signals for obtaining plural output color component signals specific to the apparatus; and
    (c) control means for controlling the output color component signals from said process means, according to said output color component control signal;
    wherein said input means inputs said input color component signal and said output color component control signal by executing a communication including a command with an auxiliary apparatus.

27. An apparatus according to claim 26, further comprising:
   (a) image forming means for forming color component images respectively according to said output color component signals.

28. An apparatus according to claim 26, wherein said input means enters said plural input color component signals and said output color component control signal in parallel manner.

29. An apparatus according to claim 26, wherein said input color components are three primary color components.

30. An apparatus according to claim 26, wherein said output color component signals are complementary color components.

31. An apparatus according to claim 29, wherein said three primary color components are red, green and blue components.

32. An apparatus according to claim 30, wherein said complementary color components are yellow, magenta and cyan components.

33. An apparatus according to claim 26, wherein said output color component control signal is adapted to prohibit the output of predetermined components in the output color components.

34. An apparatus according to claim 26, wherein said output color component control signal is adapted to prohibit the output of predetermined components in the output color components and to maintain other output components at a predetermined value.

35. An apparatus according to claim 26, wherein said output color component control signal is adapted to maintain predetermined output color components at a predetermined value.

36. An apparatus according to claim 26, wherein said image forming means is adopted to effect image formation by an electrophotographic process.

37. An apparatus according to claim 26, wherein said predetermined components are those other than black.

38. An apparatus according to claim 26, wherein said predetermined component in black component.

39. An apparatus according to claim 26, wherein said process means comprises a masking circuit.

40. An interface adapted for use in a color image forming apparatus provided with process means for processing plural input color component signals to obtain output color component signals, comprising:
   (a) first input means for entering said plural input color component signals; and
   (b) second input means for entering an output color control signal for controlling the output of said output color component signals;
   wherein each of said first input means and said second input means inputs said plural input color component signals and said output color component control signal by executing a communication including a command with an auxiliary apparatus.

41. An interface according to claim 40, wherein said first and second input means enter said signals in parallel manner.

42. An interface according to claim 40 wherein said input color components are three primary color components.

43. An interface according to claim 40, wherein said output color component signals are complementary color components.

44. An interface according to claim 42, wherein said three primary color components are red, green and blue components.

45. An interface according to claim 43, wherein said complementary color components are yellow, magenta and cyan components.

46. An interface according to claim 40, wherein said output color component control signal is adapted to prohibit the output of predetermined components in the output color components.

47. An interface according to claim 40, wherein said output color component control signal is adapted to prohibit the output of predetermined components in the output color components and to maintain other output components at a predetermined value.

48. An interface according to claim 40, wherein said output color component control signal is adapted to maintain predetermined output color components at a predetermined value.

49. An interface according to claim 40, wherein said predetermined components are those other than black.

50. An interface according to claim 40, wherein said predetermined component is black component.

* * * * *